United States Patent [19]
Poindexter

[11] Patent Number: 5,301,516
[45] Date of Patent: Apr. 12, 1994

[54] POTABLE WATER COLLECTION APPARATUS

[76] Inventor: Forrest Poindexter, 7729 Jewelweed Ct., Springfield, Va. 22152

[21] Appl. No.: 16,455

[22] Filed: Feb. 11, 1993

[51] Int. Cl.⁵ .............................................. F25B 49/00
[52] U.S. Cl. ....................................... 62/126; 62/127; 62/129; 62/173; 62/188; 165/72
[58] Field of Search ............... 62/90, 125, 126, 129, 62/127, 173, 188, 428, 272, 285, 288; 165/72

[56] References Cited

U.S. PATENT DOCUMENTS 2,930,208  3/1960  Lyman ..................................... 62/90
3,500,654  3/1970  Sholtes .................................... 62/188

Primary Examiner—John M. Sollecito
Attorney, Agent, or Firm—Rodger H. Flagg

[57] ABSTRACT

An improved potable water collection apparatus contained within a housing, for the collection of potable water from a dynamic airflow extending between inlet and outlet ports. A compressor is mounted within the housing to circulate a refrigerant fluid in a closed loop circulation system between the compressor, a condenser coil and a cooling coil. The condenser coil and the cooling coil are mounted in the dynamic airflow extending between the inlet and outlet ports. A water collection pan is located beneath the cooling coils to collect condensation which forms as water droplets on the outer surface of the cooling coils, and directs the collected water droplets into a suitable water collection container. A water filter is disposed between the collection pan and the container. A liquid level sensor stops the operation of the compressor when the water in the collection container reaches a desired level. A temperature and/or pressure sensing valve mounted between the condensation coils and the cooling coils is used to optimize the flow of refrigerant fluid through the closed loop system. A cleaning access member is positioned to selectively provide access to the cooling coils and the collection pan when the apparatus is not in operation. A movable panel member is selectively positioned in a closed position between cooling coil and the condensation coil for ease of cleaning.

20 Claims, 3 Drawing Sheets

5,301,516

POTABLE WATER COLLECTION APPARATUS

BACKGROUND OF THE INVENTION

1. Field of the Invention

This invention relates to an improved dehumidification system for transforming water vapor from the atmosphere into potable water suitable for drinking, and more particularly to obtaining drinking quality water from the atmosphere by condensation, as dynamic airflow is drawn from an inlet port, across a plurality of cooling coils and condenser coils to an outlet port, while a fluid refrigerant is circulated by a compressor through the cooling coils and the condenser coils, in a closed loop circulation cycle. Due to the temperature differential between the passing air and the cooling coils, liquid condensation gathers on the outside of the cooling coils, where the condensation forms water droplets, which flow by gravity from the cooling coils into a water collection pan positioned beneath the coils.

2. Description of the Prior Art

U.S. Pat. No. 4,214,454 issuing on Jul. 29, 1980 to James C. Taylor discloses a water recovery system employing a shutter control apparatus for varying the proportion of air from first and second air streams in a predetermined airflow ratio responsive to atmospheric conditions.

U.S. Pat. No. 3,675,442 issuing Jul. 11, 1972 to Rollin J. Swanson discloses an atmospheric water collector, wherein refrigerated water is circulated through conduits exposed to moisture laden air, and condensation is collected as output water.

U.S. Pat. No. 3,575,009 issuing Apr. 13, 1971 to Nicholas Kooney discloses a water vapor condenser adapted for use with a laundry clothes dryer, wherein the hot air from the drier passes through a chamber having a thin walled chilling unit in which ice or water is stored, and condensation is collected in a receptacle attachable to the drain.

U.S. Pat. No. 4,287,724 issuing on Sep. 8, 1981 to Ralph E. Clark discloses an air chiller/drier which cools air below its dew point for separating the condensed liquid from the cooled air to produce dry air, by passing the air through coiled conduits.

U.S. Pat. No. 2,483,120 issuing on Mar. 23, 1948 to Walter H. Freygang discloses a dehumidifying air apparatus, wherein air travels from an inlet port, through an evaporator coil, past adjustable louvers, to a fan, which forces the air through a condenser and an air filter mounted adjacent to the outlet port.

SUMMARY OF THE INVENTION

Applicant's invention discloses an improved potable water collection apparatus which is contained in a housing having a base and an enclosure, with at least one access means, and inlet and outlet ports. A compressor is preferably secured to the base, in proximity to the outlet port. Cooling coils are located in the dynamic airflow passing between the inlet port and the outlet port. A dynamic airflow means, such as a fan propeller, driven by a suitable power source, such as an electrical motor, is located in the dynamic air stream. An inlet air filter is preferably located in the path of the dynamic airflow in proximity to the inlet port.

A suitable refrigerant fluid is circulated in a closed loop circulation system between the compressor, the condenser coils, and the cooling coils. During circulation of the refrigerant fluid through the closed loop circulation system, condensation forms on the outside of the cooling coils, as the dynamic airflow passes over the cooling coils.

A water collection pan is located beneath the cooling coils to collect the condensation in the form of a plurality of water droplets as they flow by gravity from the cooling coils. A drain aperture in the collection pan directs the water into a collection container having an inlet opening located beneath the drain aperture.

The water collection container is removable from the enclosure through an access opening, which may include a closure member to selectively cover the access opening during operation of the potable water collection apparatus. A cleaning access member is provided to access the cooling coils and the water collection pan, for ease of cleaning. Access to the cooling coils and the water collection pan through the cleaning access member is provided to enable the user to properly clean all parts in contact with the collected water, including the outer surface of the cooling coils, the adjoining enclosure walls, and the water collection pan, to ensure that the water collected is fit to drink.

Preferably, a suitable water filter is disposed between the drain aperture and the inlet port on the collection container. A remote power supply, such as electrical power, wind power, solar power, pressurized air, etc. powers the compressor and the dynamic airflow means. Suitable controls selectively actuate the dynamic airflow means and the compressor.

A liquid level sensor shuts off the compressor when the water in the collection container reaches the desired level. A suitable control means, such as an electric switch, may be adapted to selectively control the operation of just the dynamic airflow means for air filtration, or both the dynamic airflow means and the compressor for combined air filtration and potable water collection.

A temperature and/or pressure sensing valve is used to control operation of the compressor to optimize the flow of refrigerant fluid through the closed loop system.

The above mentioned and other features and objects of the invention, and the manner of attaining them will be best understood by reference to the following description of an embodiment of the invention, when considered in conjunction with the accompanying drawings:

BEST MODE FOR CARRYING OUT THE INVENTION

Figure 1:
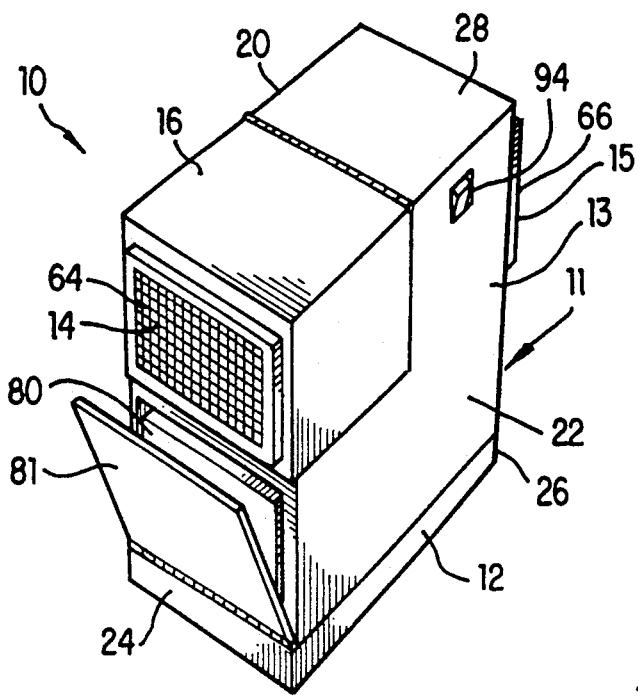
FIG. 1 is a perspective view of the potable water collecting apparatus.

The subject matter which I regard as my invention is particularly pointed out and distinctly claimed in the claims. The structure and operation of my invention, together with further objects and advantages, may be better understood from the following description given in connection with the accompanying drawings, in which:

FIG. 1 shows the potable water collection apparatus 10, having a housing 11 comprising a base 12, with an enclosure 13 which is releasably secured to the base 12. The housing 11 includes an inlet port 14, an outlet port 15, at least one cleaning access member 16, a left side 20, a right side 22, a first end 24, a second end 26, and a top portion 28.

Figure 2:
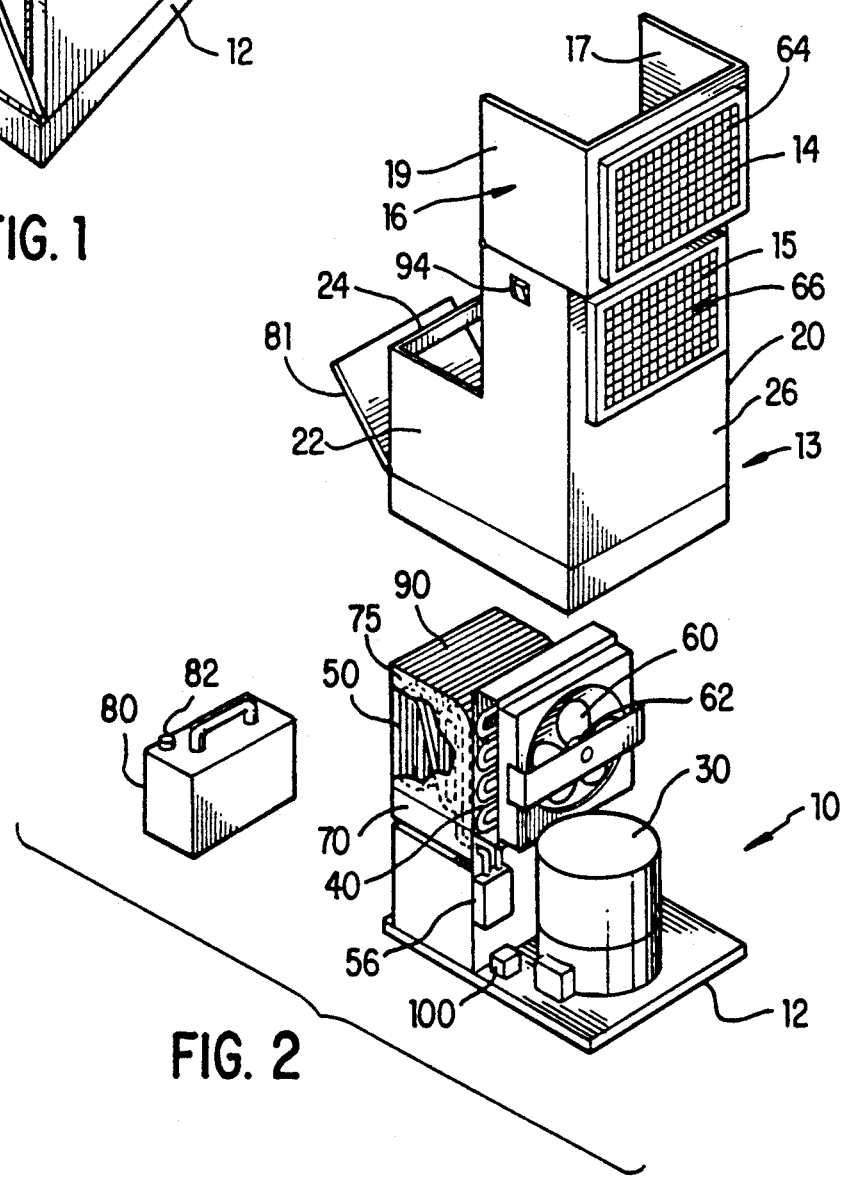
FIG. 2 is an exploded view of the apparatus shown in FIG. 1, with the housing enclosure separated from the base, and the water collection container removed from the housing.
Figure 5:
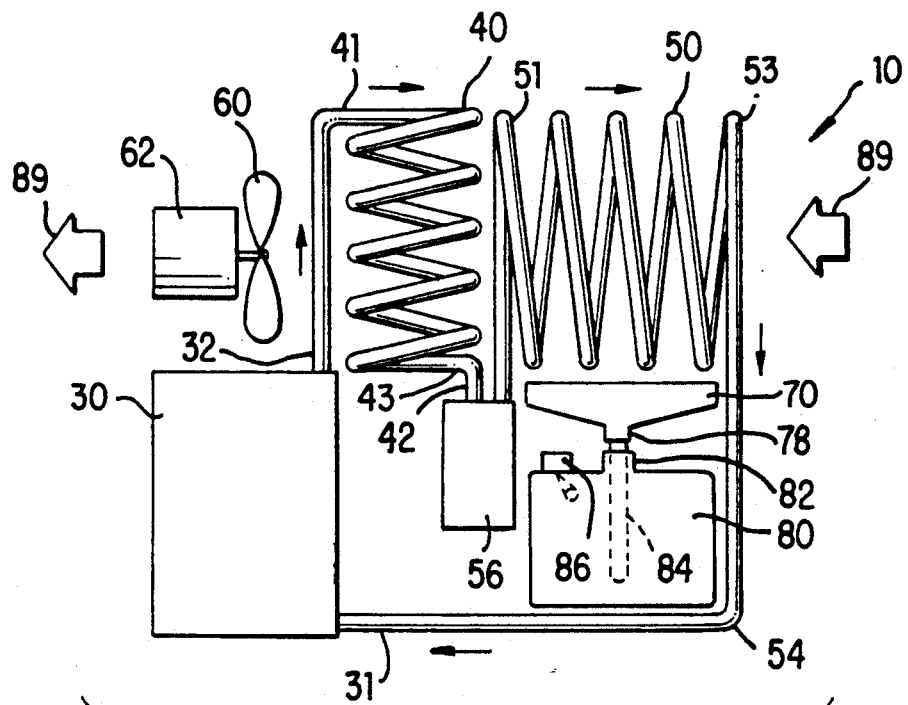
FIG. 5 is a schematic view of the apparatus showing the closed loop circulation of the refrigerant fluid through the compressor, the condenser coils and the cooling coils.

As shown in exploded view in FIG. 2, and in schematic view in FIG. 5, the enclosure 13 may be removed from the base 12, to access a compressor 30 which is preferably secured to the base 12. The compressor 30 has a fluid conduit 32 for passing refrigerant fluid (not shown) from the outlet port 33 of the compressor 30 to the inlet port 41 of the condensing coils 40.

The outlet port 43 of the condensing coils 40 has a fluid conduit 42 extending from the condensing coils 40 to the inlet port 51 of the cooling coils 50. A fluid conduit 52 extends from the outlet port 53 of the cooling coils, back to the inlet port 31 of the compressor 30, forming a closed loop circulation system 54 in which the refrigerant fluid is circulated during operation of the potable water collecting apparatus 10.

A temperature and/or pressure sensing valve 56, preferably controls the flow of refrigerant through the closed loops system 54, to maintain optimum operating conditions. The temperature and/or pressure sensing valve 56 may also serve as a safety valve to shut down the compressor 30, in event the temperature and/or pressure exceed design parameters during operation of the potable water collection apparatus 10. The temperature and/or pressure sensing valve 56 is preferably positioned in the fluid conduit 42 located between the condensation coils 40 and the cooling coils 50.

A dynamic airflow means, such as a fan propeller 60 is rotatably secured to a fan motor 62, which may be in-line, as shown in FIG. 2, or driven by a remote means, such as a fan belt, which is not shown, but is well known in the art. The fan propeller 60 is preferably positioned above the compressor 30, in proximity to the outlet port 15. The fan propeller 60 is rotatably actuated by a suitable power supply to provide a dynamic airflow 68 between the inlet port 14 and the outlet port 15.

A suitable inlet air filter 64, is preferably disposed in the dynamic airflow 68 adjacent to the inlet port 14. An outlet air filter 66, may also be provided adjacent to the outlet port 15. The inlet air filter serves to filter household dust and airborne contaminates, such as pollen or house dust, which may be present in the air. Such air filters are well known in the art, and thus not further disclosed herein.

An optional outlet air filter 66 may serve to further filter the air, and to protect the apparatus 10 from dust and air borne contamination, when the apparatus 10 is not in operation.

Figure 3:
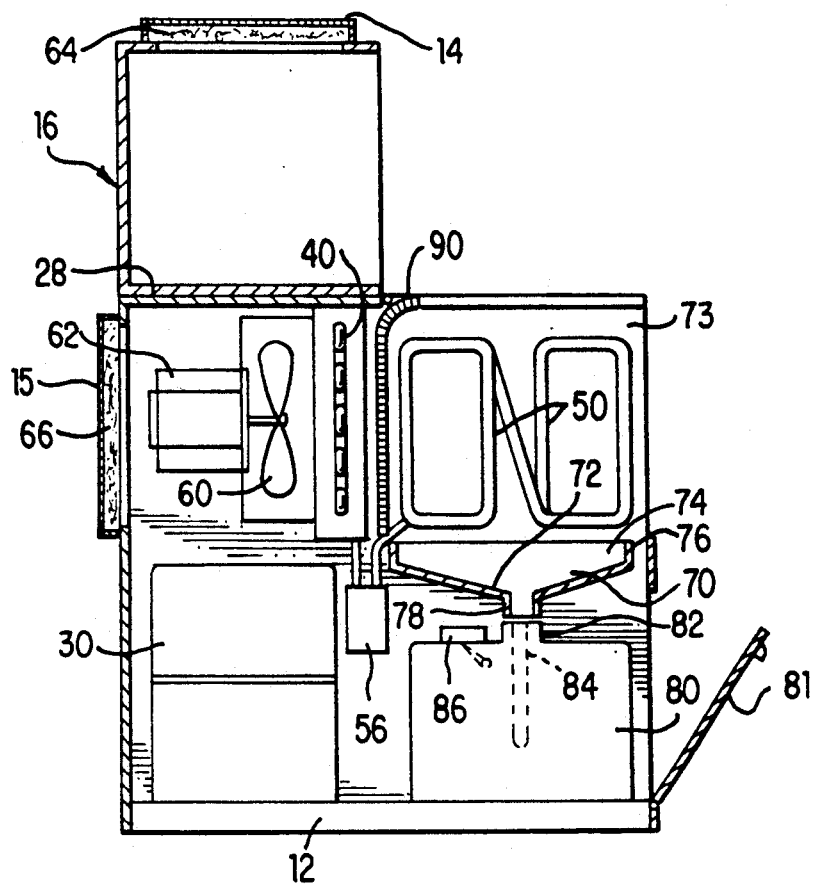
FIG. 3 is a sectional side elevation view of the apparatus, showing the cleaning access member in an open position, with a movable partition disposed between the condensation coils and the cooling coils, for ease of cleaning.
Figure 4:
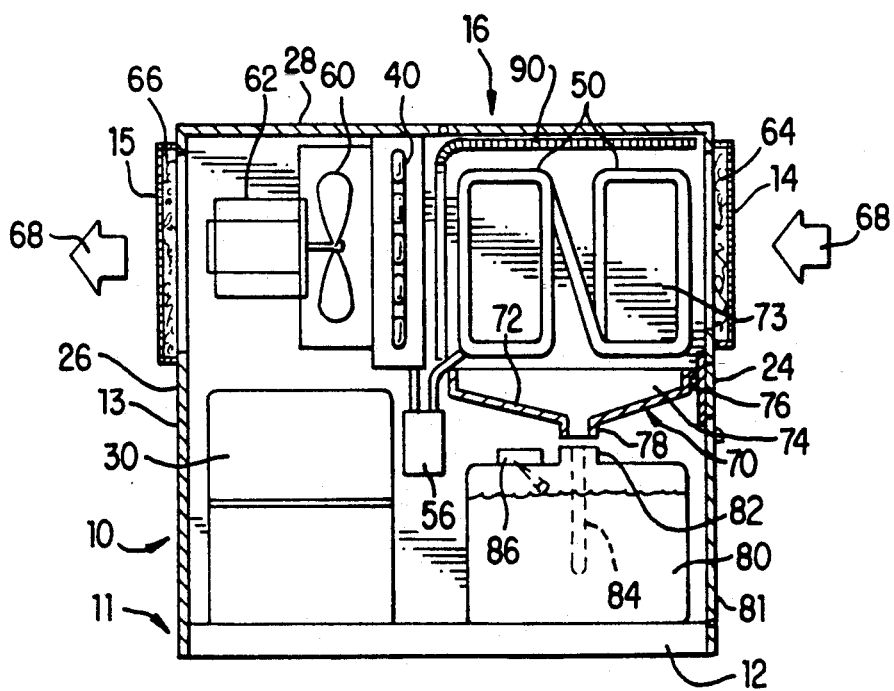
FIG. 4 is a sectional side elevation view of the apparatus, showing the cleaning access member in a closed position, with the movable partition disposed in an open position, allowing air to freely pass through the apparatus during operation of the invention.

As best shown in FIG. 3 and 4, a collection tray 70, having an inclined bottom portion 72, with raised sides 74 and ends 76, is located beneath the cooling coils 50, to receive condensation in the form of water droplets, which collect on the outside of the cooling coils 50. The water droplets flow by gravity into the collection pan 70. A suitable drain aperture 78 in the inclined bottom portion 72 of the collection pan 70, serves to funnel the collected water from the collection pan 70 into a suitable collection container 80 having an inlet opening 82 positioned beneath the drain aperture 78.

A water access panel 81 may be provided for ease of insertion or removal of the collection container 80.

The cooling coils 50 and the collection pan 70 are preferably made of stainless steel, to minimize corrosion and for ease of cleaning.

Preferably, a water filter 84 is disposed between the drain aperture 78 and the inlet opening on the collection container 80, to remove chemical and/or bacterial or viral contaminants present in the water, which have not been removed during the condensation process. The water filter 84 may extend within the collection container 80 to suit manufacturing preference. Water filters having these characteristics are well known in the art, and thus will not be further discussed herein.

The cleaning access member 16 may be raised, pivoted, slidably biased, or removed, etc. to provide access to the cooling coils 50 and the collection tray 70, for ease of cleaning. During operation of the potable water collection apparatus 10, the cleaning access member 16 encloses the cooling coils 50 to provide a dynamic airflow between the inlet port 14 and the outlet port 15, as shown in FIG. 4.

Preferably, a movable panel member 90 is disposed in a closed position between the cooling coils 50 and the condensation coils 40, to isolate the cooling coils 50 and the collection tray 70, from the rest of the potable water collection apparatus 10 for ease of cleaning. With the movable panel member 90 in closed position, spray cleaning chemicals may be isolated to all those areas of the apparatus 10 which are in direct contact with the condensation and collection of potable water.

Various types of cleaning chemicals, disinfectants, and sanitizers may be used to clean those areas in direct contact with the potable water. For example, chlorine based sanitizers, such as one hundred to two hundred ppm of available chlorine from a chemical compound such as NaOCl (sodium hypochlorite), may be used. Iodine based sanitizers, detergent-iodine sanitizers, acid sanitizers, etc. may also be used. All such suitable cleaning chemicals, disinfectants and sanitizers known in the art may be used, and such use is intended to fall within the scope of this disclosure.

The movable panel member 90 is preferably mechanically connected to the cleaning access member, so that the movable panel member 90 is closed when the cleaning access member is opened for cleaning, and the movable panel member is open, when cleaning access member is closed, to provide substantially unrestricted airflow between the inlet port and the outlet port during operation when the dynamic airflow means is in operation.

The cooling coils are preferably secured to spaced apart internal side walls 73, 75, which are independent from the sides 17, 19 of the cleaning access member. Thus, the cleaning access member may be raised as shown in FIG. 3, or lowered as shown in FIG. 4, without affecting the location or securement of the cooling coils to the internal side walls 73, 75. Thus, with the cleaning access member 16 raised as shown in FIG. 3, the cooling coils 50, internal sidewalls 73, 75 and collection pan 70 may be easily cleaned.

The movable panel member 90 is disposed in an open position during operation of the potable water collection apparatus 10 to provide substantially unrestricted dynamic airflow between the condensation coils 40 and the cooling coils 50. The movable panel member 90 may be in the form of louvers 92, positioned between the condensation coils 40 and the cooling coils 50, to provide selective positioning of the movable panel member 90 between open and closed positions.

In operation, The movable panel member 90 is selectively moved to a closed position to isolate the cooling coils 50 and the collection tray 70, for ease of cleaning, when the apparatus is not in operation, as shown in FIG. 3. The movable panel member 90 is selectively moved to an open position during operation of the fan propeller 60, to provide unrestricted dynamic airflow between the cooling coils 50 and the condensation coils 40, as shown in FIG. 4.

A liquid level sensor 86 may be used, to stop the compressor 30, when the liquid level has reached a suitable height in the collection container 80, to avoid the danger of overflow. Numerous devices are known in the art to be responsive to the water level in a collection container 80. One such device is a micro-switch. Another device is a capacitive proximity sensor. Yet another device is a pressure sensor, which may be actuated by the weight of the container as it is filled with water. Another device is a bipolar contact sensor. Yet another is a float sensor, in direct contact with the liquid in the collection container 80, etc. The liquid level sensor 86 may be adapted to electrically control the actuation of the compressor 30 to stop the collection of water when the collection container 80 is filled to the desired capacity.

Any suitable device known in the art may be used to control the liquid level in the collection container 80 by selectively shutting off the compressor 30 when the desired amount of water has been collected in collection container 80.

The dynamic airflow means, such as a fan propeller 60 may be actuated independently of the compressor 30, where air filtration is desired, without the concurrent collection of water. A suitable control means 94, such as a manual or electric switch, may be used to selectively actuate the fan motor 62 and the compressor 30, as shown in FIGS. 1 and 5.

A control circuit board 100, may be used to control the operation of the apparatus 10. The control circuit board 100, may include step-down transformers, relays, circuit breakers, and other safety devices known in the art. Alternately, such devices may be placed in proximity to their intended use, to suit manufacturing preference.

OPERATION OF THE APPARATUS

In operation, the potable water collection apparatus 10, is placed within a home, business, or other indoor or outdoor setting, where potable water may be used and/or collected. In the home apparatus shown in FIGS. 1 through 5, The apparatus 10 will supply more than a gallon of water during 8 hours use, for less than the cost in electricity of bottled water. Alternately, this apparatus may be scaled up to supply larger quantities of water, as needed or desired, without departing from the scope of this disclosure or these claims.

The apparatus 10 is plugged into a suitable power supply, such as an electrical power supply, and a suitable control means 94, such as an electrical switch, is actuated to selectively actuate the fan motor 62 and the compressor 30. Other power supply means may be used, such as solar power, gas, compressed air, hydrogen power, etc. without departing from the spirit or scope of the invention.

The dynamic airflow means, such as a fan motor which rotatably drives the fan propeller 60, draws air through the inlet port 14, and through the adjacent inlet filter 64, where the filtered air 68 passes across the cooling coils 50 and the condensation coils 40, to exit through the outlet port 15.

The compressor 30, circulates refrigerant fluid through the fluid conduit 32, where it passes through the condensation coils 40, then through the fluid conduit 42 to the cooling coils 50. The refrigerant passes through the inner surface of the cooling coils 50, and through the fluid conduit 52, back to the compressor 30. The cooling coils 50 serve to cool the dynamic airflow 68 flowing past the outside surface of the cooling coils 50, drawing moisture from the passing air in the form of condensation. The condensation forms water droplets, which fall by gravity from the outside of the cooling coils 50, into the collection pan 70. The collected water flows along the inclined bottom portion 72 of the collection pan 70, through the drain aperture 78, which is in fluid communication with the inlet aperture 82 of the collection container 80. Preferably the inlet opening 82 of the collection container 80 is positioned beneath the drain aperture 78 of the collection pan 70.

Preferably, a water filter 86 is disposed between the drain aperture 78 and the inlet opening 82 of the collection container 80. The water filter 86 is designed to remove contaminants not previously removed during the condensation process. Such contaminants may be in the form of chemical pollutants, bacteria, viruses, etc. Such water filter devices 86 are well known in the art, and may be selected to suit manufacturing preference and the environment in which the potable water collection apparatus 10 is to be operated.

A liquid level sensor 86 is preferably used, to shut off the compressor 30 when the liquid level in the water collection container 80 has reached a desired level. This eliminates the need to check the apparatus 10 repeatably to avoid excess water which may overflow the container 80. Since numerous devices are known in the art to sense the level of liquid in a container, such devices will not be discussed in detail herein.

Preferably, a temperature and/or pressure sensing valve 56 is used to control the fluid flow of refrigerant fluid within the closed loop system 54. By controlling the fluid flow within the closed loop system 54, the operation of the water collection apparatus 10 may be optimized to draw potable water from the dynamic airflow means 68 flowing through the apparatus 10. The temperature and/or pressure sensing valve 56 is preferably positioned in the fluid conduit 42 located in fluid communication between the condensing coils 40 and the cooling coils 50. Such temperature and/or pressure sensing valves are well known in the art, and thus will not be detailed herein.

The cooling coils 50 and the water collection pan 70 come in direct contact with the water droplets formed by condensation, and thus must be routinely cleaned to avoid contamination of the potable water. Thus, a cleaning access member 16 is necessary which is releasably, pivotally or slidably secured to the enclosure 13, for movable access to the cooling coils 50 and the water collection pan 70, for ease of cleaning. The collection pan 70 may be removed from the enclosure 13 through the cleaning access member 16, for ease of cleaning, if desired.

A water access panel 81 may be provided for ease of insertion and removal of the collection container 80.

A movable panel member 90 is selectively positioned in a closed position between the condensation coils 40 and the cooling coils 50, during cleaning. In this way, chemical sprays (not shown) or other cleaning soaps, fluids and disinfectants, are confined to the areas surrounding the outer surface of the cooling coils 50, the internal side walls 73, 75 adjacent to the cooling coils 50, and the collection pan 70.

Cleaning of the apparatus in contact with the water droplets, such as the outer surface of the cooling coils 50 and the internal side walls 73, 75, may be accomplished by application of cleaning fluids or disinfectants, etc. A solution of one hundred to two hundred parts per million of available chlorine, from a chemical compound such as NaOCl (sodium hypochlorite), may be used. The cleaning solution may be applied by spraying, wiping, etc., preferably followed by rinsing the cleaning fluid away from the apparatus with water.

Figure 6:
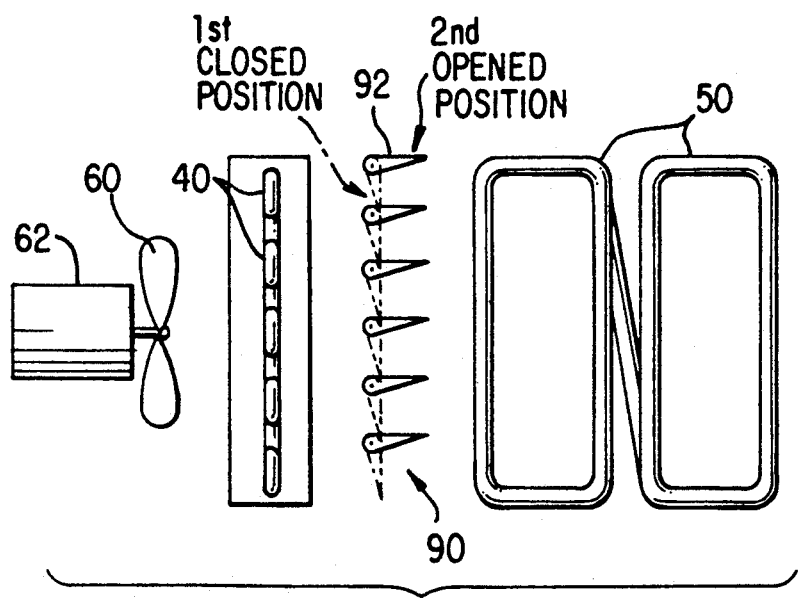
FIG. 6 is a partial view of the apparatus showing the movable panel member 90 in the form of louvers.

The movable panel member 90 is designed to be moved into an open position which does not substantially reduce the dynamic airflow 68 during operation of the dynamic airflow means 60. The movable panel member 90 may be in the form of louvers 92, as shown in FIG. 6. The louvers 92 are set in a first closed position for ease of cleaning, and then set in a second open position during operation of the dynamic airflow means. Such louvers 92 are not intended for use to selectively control air flow 68 during operation of the potable water collection apparatus 10, or to vary the proportion of air to a predetermined ratio responsive to atmospheric conditions, as taught in the prior art.

Thus, while the novel potable water collection apparatus 10 has been fully disclosed and described herein, numerous modifications will become readily apparent to one of ordinary skill in this art, and such adaptations and modifications are intended to be included within the scope of the following claims.

I claim:

1. A potable water collection apparatus having a suitable power supply, comprising:
   a) a housing having a base with an enclosure secured to the base, the housing having a top, left and right sides, and opposing ends, an inlet port, and an outlet port;
   b) a fluid refrigerant compressor mounted within the housing;
   c) a dynamic airflow means selectively powered by the power supply to generate a dynamic airflow between the inlet port and the outlet port;
   d) a condenser coil mounted within the housing in fluid communication with the compressor, the condenser coil located in the path of the dynamic airflow between the inlet port and the outlet port;
   e) a cooling coil mounted within the enclosure, the internal surface of the cooling coil in fluid communication with the condenser coil and the compressor, forming a closed loop circulation system for the circulation of the refrigerant fluid, the outer surface of the cooling coil located in the path of the dynamic airflow between the condenser coil and the inlet port;
   f) a collection pan having a liquid drain aperture, the collection pan mounted within the enclosure below the cooling coil;
   g) a potable water collection container having an inlet port in fluid communication with the liquid drain aperture on the collection pan and positioned to receive liquid from the collection pan through the inlet port;
   h) a cleaning access member positioned to selectively provide access to the outer surface of the cooling coil and the collection pan when the potable water collection apparatus is not in operation, and to selectively enclose the outer surface of the cooling coil and the collection pan to provide a confined and substantially unrestricted dynamic airflow between the inlet port and the outlet port when the potable water collection apparatus is in operation;
   i) a movable panel member selectively positioned in a closed position between the cooling coil and the condensation coil, to isolate the cooling coil from the condensation coil for ease of cleaning when the potable water collection apparatus is not in operation; the movable panel member selectively positioned in an open position to provide substantially unrestricted airflow between the outer surface of the cooling coil and the condensation coil when the dynamic air flow means is actuated; and wherein potable water is collected from the dynamic airflow by condensation formed on the outer surface of the cooling coil, as the refrigerant fluid is circulated through the closed loop system by operation of the compressor.

2. The apparatus of claim 1, wherein the cleaning access member is hinged to the enclosure to enclose the cooling coil between the inlet and outlet ports when closed, and to expose the outer surface of the cooling coil and the water collection pan for ease of cleaning, when the cleaning access member is open.

3. The apparatus of claim 1, wherein at least one air filter is disposed between the inlet port and the cooling coil.

4. The apparatus of claim 1, wherein a water filter is removably positioned in liquid communication between the drain aperture in the liquid collection pan and the inlet port on the potable water container.

5. The apparatus of claim 1, wherein a flow control valve responsive to at least one of the temperature and the pressure of the refrigerant, controls the flow of refrigerant in the closed loop circulation system.

6. The apparatus of claim 1, wherein a liquid level sensor is responsive to the level of liquid in the container, to stop operation of the compressor when the potable liquid container is filled to a desired capacity.

7. The apparatus of claim 6, wherein the liquid level sensor is a float sensor.

8. The apparatus of claim 1, wherein at least one air filter is disposed adjacent to the outlet port.

9. The apparatus of claim 1, wherein the cooling coil and the drip collection pan are made of stainless steel.

10. A potable water collection apparatus comprising:
   a) a housing having a base and an enclosure, the housing further having an inlet port and an outlet port;
   b) a fluid refrigerant compressor mounted within the housing and operated by a suitable power supply;
   c) a fan blade rotatably powered by a fan motor within the housing, the fan blade positioned in a dynamic airflow path between the inlet and outlet ports;

d) a condenser coil in fluid communication with the refrigerant compressor, the condenser coil positioned within the housing in the dynamic airflow path between the inlet port and the outlet port;

e) a cooling coil in fluid communication with the condenser coil and the refrigerant compressor, the cooling coil having an outside surface positioned within the housing in the dynamic airflow path between the condenser coil and the inlet port;

f) an air filter removably positioned adjacent to the inlet port;

g) a collection pan positioned beneath the cooling coil, to collect potable water generated by condensation from the outside surface of the cooling coil, the collection pan having a drain aperture therethrough;

h) a collection container having an inlet aperture in fluid communication with the drain aperture on the collection pan;

i) a cleaning access member positioned to provide access to the cooling coils and the collection pan when the potable collection apparatus is not in operation, for ease of cleaning, and positioned to provide an enclosure about the outer surface of the cooling coils to provide dynamic airflow between the inlet and outlet ports when the potable collection apparatus is in operation;

j) a movable closure member disposed in closed position between the condensation coil and the cooling coil to isolate the cooling coil and the collection pan for ease of cleaning; and the movable closure member disposed in an open position between the condensation coil and the cooling coil to provide substantially unrestricted dynamic airflow between the inlet and outlet ports; wherein the fan motor is actuated to provide dynamic airflow; and the fan motor and the compressor are actuated to provide filtration of the air and the collection of potable water, as the refrigerant fluid is circulated in the closed loop circulation system between the compressor, the condensation coil and the cooling coil.

11. The apparatus of claim 10, wherein the cleaning access member is hinged to the enclosure to enclose the cooling coil on the top, left and right sides and to support the inlet port on one end when closed, and to expose the outer surface of the cooling coil and the water collection pan for ease of cleaning, when the cleaning access member is open.

12. The apparatus of claim 10, wherein the cooling coil and the collection pan are made of stainless steel, for corrosion resistance and for ease of cleaning.

13. The apparatus of claim 10, wherein a water filter is removably positioned in liquid communication between the drain aperture in the liquid collection pan and the inlet port on the potable water container.

14. The apparatus of claim 10, wherein a control valve responsive to at least one of the temperature and the pressure of the refrigerant, controls the flow of refrigerant in the closed loop circulation system.

15. The apparatus of claim 10, wherein a liquid level sensor is responsive to the level of liquid in the container, to stop operation of the compressor when the potable liquid container is filled to a desired capacity.

16. The apparatus of claim 15, wherein the liquid level sensor is a float sensor.

17. A potable water collection apparatus comprising:
a) a housing having a base and an enclosure, the housing further having an inlet port and an outlet port;
b) a fluid refrigerant compressor mounted within the housing and operated by a suitable power supply;
c) a dynamic airflow means positioned in a dynamic airflow path between the inlet and outlet ports;
d) a condenser coil in fluid communication with the refrigerant compressor, the condenser coil positioned within the housing in the dynamic airflow path between the inlet port and the outlet port;
e) a stainless steel cooling coil having an inner surface in fluid communication with the condenser coil and the refrigerant compressor, the cooling coil having an outer surface positioned within the housing in the dynamic airflow path between the condenser coil and the inlet port;
f) an air filter removably positioned adjacent to the inlet port;
g) a stainless steel collection pan positioned beneath the cooling coil, to collect potable water generated by condensation from the outside surface of the cooling coil, the collection pan having a drain aperture;
h) a collection container having an inlet aperture in fluid communication with the drain aperture on the collection pan;
i) a water filter in fluid communication between the collection pan and the collection container to filter the potable water as it passes therebetween;
j) a cleaning access member positioned to provide access to the outer surface of the cooling coils and the collection pan when the potable collection apparatus is not in operation, for ease of cleaning; and positioned to provide an enclosure about the cooling coils to provide dynamic airflow between the inlet and outlet ports when the potable collection apparatus is in operation;
k) a movable closure member disposed in closed position between the condensation coil and the cooling coil to isolate the cooling coil and the collection pan for ease of cleaning; and the movable closure member disposed in an open position between the condensation coil and the cooling coil to provide substantially unrestricted dynamic airflow between the inlet and outlet ports; wherein the dynamic airflow means is actuated to provide dynamic airflow and filtration of the air; and the fan motor and the compressor are actuated to provide filtration of the air and the collection of potable water, as the refrigerant fluid is circulated in the closed loop circulation system between the compressor, the condensation coil and the cooling coil.

18. The apparatus of claim 17, wherein a flow control valve responsive to at least one of the temperature and the pressure of the refrigerant, controls the flow of refrigerant in the closed loop refrigerant circulation system.

19. The apparatus of claim 17, wherein a liquid level sensor is responsive to the level of liquid in the container, to stop operation of the compressor when the potable liquid container is filled to a desired capacity.

20. The apparatus of claim 17, wherein the liquid level sensor is a float sensor.

* * * * *